United States Patent

Ishibuchi et al.

(10) Patent No.: US 8,056,707 B2
(45) Date of Patent: Nov. 15, 2011

(54) HEAT RESISTANT LAMINATED CONVEYOR BELT AND MANUFACTURING METHOD THEREOF

(75) Inventors: Hiroshi Ishibuchi, Hiroshima (JP); Takashi Nitta, Mihara (JP); Hideo Imazato, Matsuura (JP); Takafumi Arakawa, Narita (JP)

(73) Assignees: Mitsubishi Heavy Industries Printing & Packaging Machinery, Ltd., Hiroshima (JP); Chukoh Chemical Industries, Ltd., Tokyo (JP)

( * ) Notice: Subject to any disclaimer, the term of this patent is extended or adjusted under 35 U.S.C. 154(b) by 673 days.

(21) Appl. No.: 10/590,147

(22) PCT Filed: May 16, 2005

(86) PCT No.: PCT/JP2005/008851
§ 371 (c)(1),
(2), (4) Date: Dec. 1, 2006

(87) PCT Pub. No.: WO2005/110728
PCT Pub. Date: Nov. 24, 2005

(65) Prior Publication Data
US 2009/0014122 A1 Jan. 15, 2009

(30) Foreign Application Priority Data
May 19, 2004 (JP) ................. 2004-149541

(51) Int. Cl.
B65G 21/00 (2006.01)
B65G 17/00 (2006.01)
B65G 35/00 (2006.01)
(52) U.S. Cl. .................. 198/844.1; 198/793; 198/860.3; 198/866
(58) Field of Classification Search .................. 198/793, 198/860.3, 866
See application file for complete search history.

(56) References Cited

U.S. PATENT DOCUMENTS
3,924,482 A * 12/1975 Meadows ................. 474/265
4,052,243 A * 10/1977 Yazawa et al. ............ 156/265
5,421,450 A    6/1995 Kitagawa et al.

FOREIGN PATENT DOCUMENTS
JP            10-119152      5/1998
(Continued)

OTHER PUBLICATIONS
Official Action issued Nov. 20, 2009 in the corresponding Canadian Patent Application No. 2,557,618.
(Continued)

*Primary Examiner* — Gene Crawford
*Assistant Examiner* — Yolanda Cumbess
(74) *Attorney, Agent, or Firm* — Wenderoth, Lind & Ponack, L.L.P.

(57) ABSTRACT

Provided are a heat resistant laminated conveyor belt and manufacturing method thereof by which a belt surface pressure when a liner and corrugated core paper are pressed and bonded together can be increased to thereby enhance a bonding performance. The heat resistant laminated conveyor belt comprises a belt core layer 11 made by a heat resistant non-metallic fiber substrate being impregnated with a fluororesin dispersion and then dried and sintered and a surface layer 13 (plain weave wire, etc., for example) formed on the belt core layer 11 via an adhesive layer 12 made by a fluororesin film, the surface layer having a fabric structure using an element wire or wires made of a ferrous metal or having a structure in which the element wire or wires are arranged together.
As the surface layer 13, a fabric structure using an element wire or wires made of a non-ferrous metal, inorganic compound, organic compound or carbon is used or a structure in which the element wire or wires are arranged together (plain weave wire, parallel wire, etc., for example) is used. As the element wires, stranded wires, parallel wires or the like are used.

7 Claims, 6 Drawing Sheets

FOREIGN PATENT DOCUMENTS

| | | |
|---|---|---|
| JP | 2584218 | 8/1998 |
| JP | 11-105171 | 4/1999 |
| JP | 11105171 A * | 4/1999 |
| JP | 11-216787 | 8/1999 |

OTHER PUBLICATIONS

Japanese Office Action issued Aug. 9, 2011 in corresponding Japanese Application No. 2006-519542.

* cited by examiner a: Heat resistant fiber or stainless steel wire (CD direction)
b: Heat resistant fiber or stainless steel wire (MD direction)
c: Heat resistant fiber or stainless steel wire (CD direction)

a: Heat resistant fiber (CD direction)
b: Heat resistant fiber (MD direction)
c: Heat resistant fiber (CD direction)

a: Heat resistant fiber or stainless steel wire ( 45° bias relative to CD direction)
b: Heat resistant fiber or stainless steel wire ( 45° bias relative to MD direction)
c: Heat resistant fiber or stainless steel wire ( 45° bias relative to CD direction)

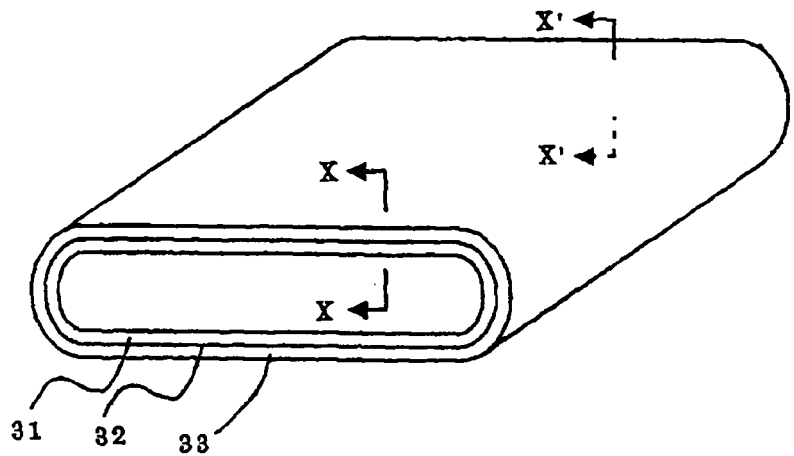
Fig. 4 (A) (Prior Art)
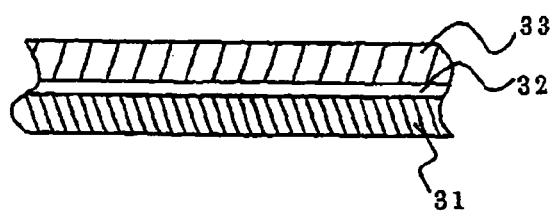
Fig. 4 (B) (Prior Art)

HEAT RESISTANT LAMINATED CONVEYOR BELT AND MANUFACTURING METHOD THEREOF

TECHNICAL FIELD

The present invention relates to a heat resistant laminated conveyor belt suitable as a pressing belt for use in a corrugated board manufacturing apparatus and also relates to a manufacturing method thereof.

BACKGROUND OF THE INVENTION

Conventionally, a heat resistant laminated conveyor belt of such a construction as shown in FIGS. 4(A) and (B) is used in a corrugated board manufacturing apparatus (Patent Document 1).

In FIGS. 4(A) and (B), numeral 31 designates a belt core layer that has a thickness of about 0.5 mm. The belt core layer 31 is made by repeating several times such a step that a plain weave fabric of aramide fiber is impregnated with a polytetrafluoroethylene (PTFE) dispersion (suspension) and is then dried and sintered.

On the belt core layer 31 (on an outer surface side thereof), an adhesive layer 32 is formed. The adhesive layer 32 is a perfluoroalkoxyl (PFA) film layer having a thickness of about 25 μm. Further, on an outer surface thereof, a reinforcing layer 33 having a thickness of about 0.5 mm is formed.

The reinforcing layer 33 is made by repeating several times such a step that a knitted fabric of aramide fiber is impregnated with the PTFE dispersion and is then dried and sintered.

The heat resistant laminated conveyor belt so constructed is usually used as a pressing belt for use in a corrugated board manufacturing apparatus (single facer), for example, as shown in FIG. 5.

FIG. 5 is a schematic constructional view showing a mechanism for manufacturing a single faced corrugated board by a lamination method using a pressing belt. In FIG. 5, numeral 4 designates an upper corrugating roll that meshes with a lower corrugating roll 5. On the upper side of the upper corrugating roll 4 and in the vicinity thereof, two rolls 6a, 6b are arranged. An endless type pressing belt 7 is provided being wound around the two rolls 6a, 6b.

In the system of FIG. 5, a core paper 8 (corrugating medium) is caused to pass through between the upper corrugating roll 4 and lower corrugating roll 5 and further between the upper corrugating roll 4 and pressing belt 7, as shown by arrow X. Also, a liner 9 is caused to pass through between the upper corrugating roll 4 and pressing belt 7, as shown by arrow Y. Thereby, the core paper 8 is corrugated along an outer surface of the upper corrugating roll 4 and a glue (not shown) is applied to a top of each corrugation of the core paper 8 so that the core paper 8 and liner 9 are bonded together to form a lamination and a single faced corrugated board 10 is manufactured.

It is to be noted that when the core paper 8 and liner 9 are caused to pass through between the upper corrugating roll 4 and pressing belt 7, by function of the rolls 6a, 6b and pressing belt 7, such a pressing force as shown by arrows Z is generated to act on the core paper 8 and liner 9. The conveyor belt shown in the Patent Document 1 relates to such a pressing belt.

Patent Document 2 provides a press-bonded belt having a layer construction comprising a core fabric (1), adhesive layer (2) and surface fabric (3), wherein the core fabric (1) is a seamless fabric using a heat resistant high strength fiber yarn, the surface fabric (3) is a woven fabric having an obliquely crossing warp and weft structure using a heat resistant high strength fiber yarn and an impregnated layer or coated layer of fluororesin is applied at least to the surface fabric (3). This belt is also used in the single faced corrugated board manufacturing apparatus, as in the Patent Document 1.

Patent Document 3 provides a steam permeable pressing belt comprising a substrate of metallic warp and weft. The warp comprises sets of warps, each set of warps including three warps, and an interval between adjacent two sets of warps is smaller than a width of each set of warps. A weft material is preferably softer than a warp material and each weft has notches in which the warps are arranged. This belt is also used in the single faced corrugated board manufacturing apparatus, as in the Patent Documents 1 and 2.

Patent Document 1: Japanese Utility Model Registration 2584218 (FIG. 4)

Patent Document 2: Japanese Laid-Open Patent Application 1999-105171

Patent Document 3: Japanese Laid-Open Patent Application 1999-216787

In the heat resistant laminated conveyor belt of the construction shown in the Patent Document 1, as the belt surface fabric is soft as compared with a high hardness material, such as steel, and its surface shape is flat, if it is used as a pressing belt of a corrugated board manufacturing apparatus, the belt surface pressure at the time when the liner and corrugated core paper are pressed to be bonded together becomes low. Thus, there is a possibility to cause a bonding defect when the production velocity is elevated for manufacturing a single faced corrugated board.

The bonding ability of the liner and core paper at the corrugated board manufacturing time depends on a surface hardness and surface shape of the belt. Hence, by enhancing the belt characteristics, enhancement of the bonding ability can be achieved. In the heat resistant conveyor belt of the construction shown in the Patent Document 1, a belt surface reinforcing layer made by a PTFE coated knitted fabric of aramide fiber is used for which the PTFE coated knitted fabric is obtained by repeating several times such a step that a knitted fabric of aramide fiber is impregnated with a PTFE resin dispersion and is then dried and sintered and the abrasion resistance and rigidity thereof are enhanced by increasing the number of mesh of the knitted fabric.

However, the material of this reinforcing layer is of a cushioning nature and its surface shape is flat. Hence, the belt surface pressure at the time when the liner and corrugated core paper are pressed to be bonded together becomes low. Thus, when the production velocity for manufacturing the single faced corrugated board is elevated, there is a possibility to cause a bonding defect. Also, impregnation of the fluororesin into the reinforcing layer and drying and sintering thereof are needed and hence there is a problem that the manufacturing process becomes complicated.

In the belt shown in the Patent Document 2, as the surface thereof is covered by the film layer to become soft as compared with a high hardness material, such as steel, the belt surface pressure at the time when the liner and corrugated core paper are pressed to be bonded together becomes low so that there is a possibility to deteriorate the bonding performance. Also, impregnation, drying and sintering of the surface fabric are needed and hence there is a problem that the manufacturing process becomes complicated.

In the belt shown in the Patent Document 3, as the structure thereof is a one-layer structure in which metallic yarns are sewed together, the belt is weak against bending fatigues and the life thereof is extraordinarily short.

DISCLOSURE OF THE INVENTION

In order to solve the above-mentioned problems in the prior art conveyor belt, it is an object of the present invention to provide a heat resistant laminated conveyor belt in which a belt surface layer is provided with a high surface hardness as well as provided with an uneven surface shape by a fabric structure using an element wire or wires or by a structure in which an element wire or wires are arranged together so that a belt surface pressure can be increased to thereby enhance a bonding performance at the time when a liner and corrugated core paper are pressed to be bonded together as well as to enhance a production velocity for manufacturing a single faced corrugated board. Also, it is an object of the present invention to provide a manufacturing method of a heat resistant laminated conveyor belt in which none of impregnation, drying and sintering of fluororesin in a surface layer is needed to thereby enhance a manufacturing efficiency.

In order to achieve the above-mentioned objects, the present invention provides a heat resistant laminated conveyor belt characterized in comprising a belt core layer made by a heat resistant non-metallic fabric being impregnated with a fluororesin dispersion and then dried and sintered and a surface layer (a plain weave wire, knitted wire, etc., for example) formed on the belt core layer via an adhesive layer made by a fluororesin film, the surface layer having a fabric structure using an element wire or wires (standard wires, parallel wires, etc.) made of a ferrous metal or made of at least one of a non-ferrous metal, inorganic compound, organic compound and carbon or having a structure in which the element wire or wires (standard wires, parallel wires, etc.) are arranged together.

Also, the heat resistant laminated conveyor belt of the present invention may employ such a construction that an intermediate layer is laminated on the belt core layer via an adhesive layer made by a fluororesin film to be positioned between the belt core layer and surface layer, the intermediate layer being made by a heat resistant non-metallic fabric being impregnated with a fluororesin dispersion and then dried and sintered.

According to the heat resistant laminated conveyor belt of the present invention, a surface layer of a pressing belt can be made with a fabric structure using an element wire or wires (standard wires, parallel wires, etc.) made of a material having a high surface hardness, such as a ferrous metal or at least one of a non-ferrous metal, inorganic compound, organic compound and carbon, or with a structure (a plain weave wire, knitted wire, etc.) in which the element wire or wires (standard wires, parallel wires, etc.) are arranged together. Thereby, a crossing portion of the element wires of the surface layer with a corrugation top portion of an upper corrugating roll used for manufacture of a single faced corrugated board becomes a point contact by which bonding pressure can be efficiently generated. Thus, the bonding performance of the liner bonded with the corrugated core paper can be enhanced.

Also, if the element wire is of a ferrous metal, the thermal conductivity is high and the liner heating efficiency at the time when the liner is pressed against, and bonded with, the core paper can be enhanced.

The heat resistant non-metallic fabric of the present invention can be made by a fiber of at least one of a glass fiber, carbon fiber, aramide fiber, aromatic allylate fiber and poly-paraphenylenebenzobisoxazole (PBO) fiber.

Moreover, the present invention provides a heat resistant laminated conveyor belt manufacturing method characterized in comprising: a first step of forming a belt core layer by a heat resistant non-metallic fabric being impregnated with a fluororesin dispersion and then dried and sintered and a second step of lapping a surface layer (a plain weave wire, knitted wire, etc., for example) over the belt core layer via an adhesive layer made by a fluororesin film, the surface layer having a fabric structure using an element wire or wires (standard wires, parallel wires, etc.) made of a ferrous metal or made of at least one of a non-ferrous metal, inorganic compound, organic compound and carbon or having a structure in which the element wire or wires (standard wires, parallel wires, etc.) are arranged together, and bonding them together with the belt core layer by a heat sealing lamination process.

The heat resistant laminated conveyor belt manufacturing method of the present invention may include a step of forming an intermediate layer by a heat resistant non-metallic fabric being impregnated with a fluororesin dispersion and then dried and sintered and lapping it over the belt core layer via an adhesive layer made by a fluororesin film so as to be laminated between the belt core layer and surface layer by the heat sealing lamination process.

In the heat resistant laminated conveyor belt manufacturing method according to the present invention, as the heat resistant non-metallic fabric of the belt core layer, a plain weave fabric is used. Usually, a sack-form weave fabric or seamless weave fabric of aramide fiber is used for reason of convenience in manufacturing the belt, but the fabric material is not limited thereto.

As the fluororesin impregnated in the fabric, a polytetrafluoroethylene (PTFE) resin, tetrafluoroethylene hexafluoropropylene copolymer (FEP) resin, tetrafluoroethylene perfluoroalkoxyethylene copolymer (PFA) resin or the like, for example, is used. Usually, a polytetrafluoroethylene (PTFE) resin is used for reason of many brands available according to the purpose of use.

Also, as the fluororesin used for the fluororesin film of the adhesive layer of the present invention, a polytetrafluoroethylene (PTFE) resin, denatured polytetrafluoroethylene (denatured PTFE) resin, tetrafluoroethylene hexafluoropropylene copolymer (FEP) resin, tetrafluoroethylene perfluoroalkoxyethylene copolymer (PFA) resin, ethylene tetrafluoroethylene copolymer (ETFE) resin, ethylene chlorotrifluoroethylene copolymer (ECTFE) resin or the like is used. Usually, a tetrafluoroethylene perfluoroalkoxyethylene copolymer (PFA) resin is used for reason of the heat resisting performance.

As a material of the element wire used for the surface layer of the present invention, a ferrous metal of steel, carbon steel, stainless steel or the like, non-ferrous metal of aluminum, copper, titanium or the like, inorganic compound of glass, alumina, silica, alumina silica, zirconia or the like, organic compound of polyetheretherketone, polyimide, polyamide-imide, polyetherimide, polyphenylene sulfide, aromatic allylate or the like, carbon or the like is used.

As a texture in case where a woven structure is used for the surface layer of the present invention, a woven wire, hexagonal wire, crimp wire, or satin weave, mimic gauze weave, leno weave, or the like can be used. As a knitted structure having the same function as these woven structures, a knitted weave, for example, can be used.

Moreover, in the heat resistant laminated conveyor belt according to the present invention, in place of the above-mentioned belt core layer of single layer, belt core layers of a plurality of layers constructed in the same way as mentioned above and laminated via a plurality of adhesive layers likewise made by the fluororesin film as mentioned above can be used. Also, in place of the intermediate layer and surface layer both of single layer, intermediate layers and surface layers, respectively, of a plurality of layers likewise constructed as mentioned above and laminated via a plurality of adhesive layers likewise made by the fluororesin film can be used.

Also, in the heat resistant laminated conveyor belt according to the present invention, it is preferable that the surface layer, laminated on the belt core layer via the adhesive layer made by the fluororesin film, has a fabric structure using an element wire or wires (standard wires, parallel wires, etc.) made of the ferrous metal, as mentioned above, or made of at least one of the non-ferrous metal, inorganic compound, organic compound, carbon and the like, as mentioned above, or has a structure in which the element wire or wires (standard wires, parallel wires, etc.) are arranged together (in which the wire or wires are arranged being oriented in the same direction, for example).

Also, in this case, it is preferable that the intermediate layer and/or belt core layer both on the inner side of the surface layer are formed with a plurality of layers, respectively, and laminated via the adhesive layers of a plurality of layers.

According to the present invention, the surface of the belt has a hardness corresponding to a metal of steel or the like and is of an element wire structure having an uneven surface shape. Hence, the belt surface pressure when the liner and core paper are pressed and bonded together becomes higher. Thus, the bonding performance is enhanced and the single faced corrugated board production velocity can be increased. Moreover, by making the belt core layer, intermediate layer and/or surface layer with a plurality of layers, rigidity of the conveyor belt can be enhanced and durability of the belt can be increased.

BRIEF DESCRIPTION OF THE DRAWINGS

FIG. 1 is a view showing a heat resistant laminated conveyor belt of Embodiment 1 according to the present invention, wherein FIG. 1(A) is an entire perspective view of the belt, FIG. 1(B) is a cross sectional view taken on plane including X-X and X'-X' of FIG. 1(A) and FIG. 1(C) is an enlarged plan view of a surface layer 13 of the belt of FIG. 1(A).

FIG. 2 is a view showing a heat resistant laminated conveyor belt of Embodiment 2 according to the present invention, wherein FIG. 2(A) is a cross sectional side view of the belt taken along a running direction of the belt, FIG. 2(B) is an enlarged plan view of a belt core layer 11 of the belt of FIG. 2(A) and FIG. 2(C) is an enlarged plan view of a surface layer 13 of the belt of FIG. 2(A).

FIG. 3 is a view showing a heat resistant laminated conveyor belt of Embodiment 3 according to the present invention, wherein FIG. 3(A) is an entire perspective view of the belt and FIG. 3(B) is a cross sectional view taken on plane including X-X and X'-X' of FIG. 3(A).

FIG. 4 is a view showing a heat resistant laminated conveyor belt in the prior art, wherein FIG. 4(A) is an entire perspective view of the belt and FIG. 4(B) is a cross sectional view taken on plane including X-X and X'-X' of FIG. 4(A).

BEST MODE FOR CARRYING OUT THE INVENTION

Herebelow, the present invention will be more concretely described based on embodiments 1 to 4 and a comparison example, provided that the present invention is by no means limited thereto.

Embodiment 1

Figure 1:
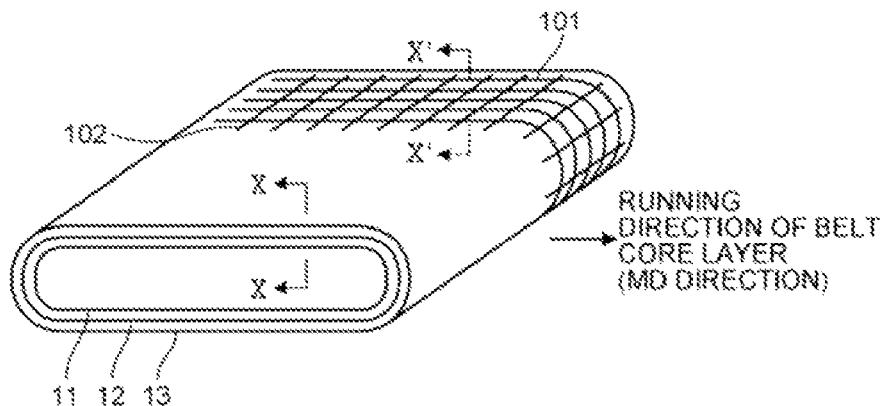
Figure 1:
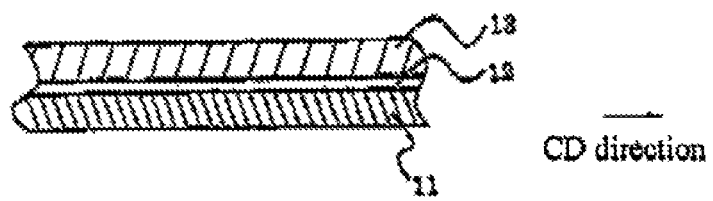
Figure 1:
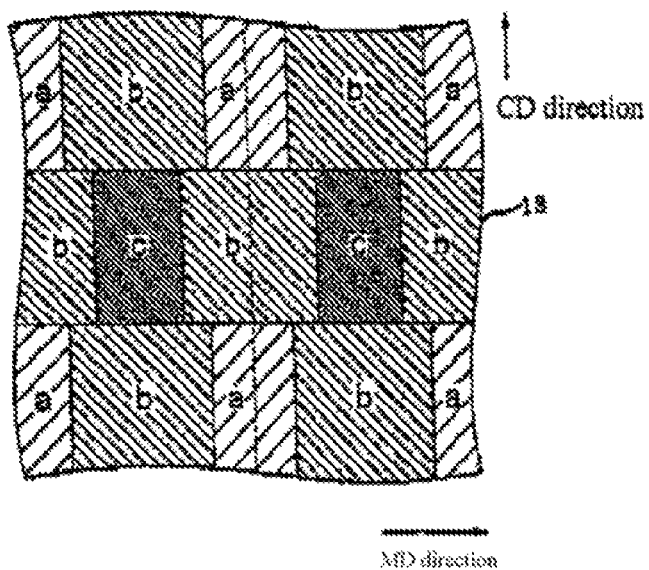

First, Embodiment 1 will be described with reference to FIGS. 1(A), (B) and (C). In the figures, numeral 11 designates a belt core layer having a thickness of about 0.5 mm made by a sack-form weave fabric or seamless weave fabric of aramide fiber being impregnated with PTFE and then dried and sintered. This belt core layer 11 is obtained by repeating several times such a step that the seamless weave fabric of aramide fiber is impregnated with a PTFE dispersion and is then dried and sintered.

On an outer side surface of the belt core layer 11, an adhesive layer 12 is formed. The adhesive layer 12 is a PFA resin film having a thickness of about 25 to 500 μm. Further, on an outer surface thereof, a surface layer 13 is formed being constructed by a stainless steel plain weave wire of 10 to 60 meshes in which a wire diameter ϕ is about 0.10 to 1.20 mm. That is, the stainless steel plain weave wire is used as the surface layer 13 laminated on the belt core layer 11 via the adhesive layer 12. In the surface layer 13, the stainless steel plain weave wires are lapped one on another, wherein, as shown in FIG. 1(A), a warp direction 101 of the plain weave wires is arranged in the same direction as a winding length direction (running direction) of the belt. It is to be noted that "MD" in the figure shows the running direction of the belt and "CD" a direction orthogonal to the running direction of the belt. The weft direction is indicated by 102.

The heat resistant laminated conveyor belt of the present Embodiment 1 is manufactured as follows:

1) First, the belt core layer 11 is manufactured by the above-mentioned method using the seamless weave fabric of aramide fiber and the PTFE resin dispersion.

2) Next, the PFA film for forming the adhesive layer 12 and the stainless steel plain weave wire for forming the surface layer 13 are cut to the size of width and winding length of the belt core layer 11, as manufactured by 1), above, in which the seamless weave fabric of aramide fiber is impregnated with the PTFE resin.

3) Next, the surface layer 13 so manufactured is lapped over the belt core layer 11 via the adhesive layer 12 and is placed between hot press platens to be applied with a heat sealing lamination process under the condition of pressure of about 1.0 to 5.0 MPa, temperature of about 340 to 420° C. and holding time of 1 to 10 minutes. Then, this operation is repeated on each feed of the layers by a pitch of platen length of the hot press, so that the entire belt core layer 11 of the seamless weave fabric is laminated with the surface layer 13 by the heat sealing. Finally, both ends of the surface layer 13 are butt-jointed so that an endless heat resistant laminated conveyor belt is manufactured.

Here, while an example of the surface layer 13 made by the plain weave wire has been described, the wire is not limited thereto but a knitted wire, for example, can be used.

Embodiment 2

Next, Embodiment 2 will be described with reference to FIGS. 2(A), (B) and (C). In a heat resistant laminated conveyor belt of the present Embodiment 2, differently from the heat resistant laminated conveyor belt of the Embodiment 1, a surface layer 13 is formed such that warp and weft directions of the plain weave wire are arranged bias by an angle of 45° relative to the winding length direction of the belt. Except that the surface layer 13 is so made, construction of the heat resistant laminated conveyor belt of the Embodiment 2 is the same as that of the Embodiment 1 and the manufacturing method of the conveyor belt is also the same. Hence, repeated description will be omitted.

Here, while an example of the surface layer 13 made by the plain weave wire has been described, the wire is not limited thereto but a knitted wire, for example, can be used.

Embodiment 3

Next, Embodiment 3 will be described with reference to FIGS. 3(A), and (B). In the figures, numeral 21 designates a belt core layer having a thickness of about 0.5 mm made by a sack-form weave fabric or seamless weave fabric of aramide fiber being impregnated with PTFE and then dried and sintered. This belt core layer 21 is obtained by repeating several times such a step that the seamless weave fabric of aramide fiber is impregnated with a PTFE dispersion and is then dried and sintered.

Numeral 23 designates an intermediate layer. This intermediate layer 23 is obtained by repeating several times such a step that a knitted fabric of aramide fiber is impregnated with a PTFE resin dispersion and is then dried and sintered. On an outer side surface of the belt core layer 21, an adhesive layer 22 is formed. The adhesive layer 22 is a PFA resin film having a thickness of about 25 to 500 μm. Further, on an outer surface of the adhesive layer 22, the above-mentioned intermediate layer 23 is formed.

On an outer side surface of the intermediate layer 23, another adhesive layer 24 is formed. The adhesive layer 24 is a PFA resin film having a thickness of about 25 to 500 μm. Further, on an outer surface of the adhesive layer 24, a surface layer 25 is formed being constructed by a stainless steel plain weave wire of 10 to 60 meshes in which a wire diameter φ is about 0.10 to 1.20 mm. That is, the stainless steel plain weave wire is used as the surface layer 25 laminated on the intermediate layer 23 via the adhesive layer 24 and the intermediate layer 23 is formed on the belt core layer 21 via the adhesive layer 22. In the surface layer 25, the stainless steel plain weave wires are lapped one on another, wherein the warp direction of the plain weave wires is arranged in the same direction as the winding length direction (running direction) of the belt.

The heat resistant laminated conveyor belt of the present Embodiment 3 is manufactured as follows:

1) First, the belt core layer 21 is manufactured by the above-mentioned method using the seamless weave fabric of aramide fiber and the PTFE resin dispersion. Also, the intermediate layer 23 is likewise manufactured using the knitted fabric of aramide fiber and the PTFE resin dispersion.

2) Next, the knitted fabric of aramide fiber impregnated with the PTFE resin for forming the intermediate layer 23, as manufactured by 1) above, the PFA resin film for forming the adhesive layers 22, 24 and the stainless steel plain weave wire for forming the surface layer are cut to the size of width and winding length of the belt core layer 21, as likewise manufactured by 1) above, in which the seamless weave fabric of aramide fiber is impregnated with the PTFE resin. Then, the belt core layer 21 so manufactured, adhesive layer 22, intermediate layer 23, adhesive layer 24 and surface layer 25 are lapped one over another in this order.

3) Next, the layers in which the belt core layer 21, adhesive layer 22, intermediate layer 23, adhesive layer 24 and surface layer 25 are so lapped are placed between hot press platens to be applied with the heat sealing lamination process under the condition of pressure of about 1.0 to 5.0 MPa, temperature of about 340 to 420° C. and holding time of 1 to 10 minutes. Then, this operation is repeated on each feed of the layers by a pitch of platen length of the hot press, so that the entire belt core layer 21 of the seamless weave fabric is laminated with the intermediate layer 23 by the heat sealing and the entire intermediate layer 23 is heat press-bonded with the surface layer 25. Finally, both ends of the intermediate layer 23 and surface layer 25, respectively, are butt-jointed so that an endless heat resistant laminated conveyor belt is manufactured.

Here, while an example of the surface layer 25 made by the plain weave wire has been described, the wire is not limited thereto but a knitted wire, for example, can be used.

Embodiment 4

Figure 2:
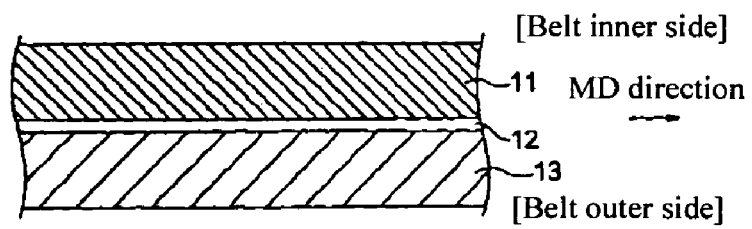
Figure 2:
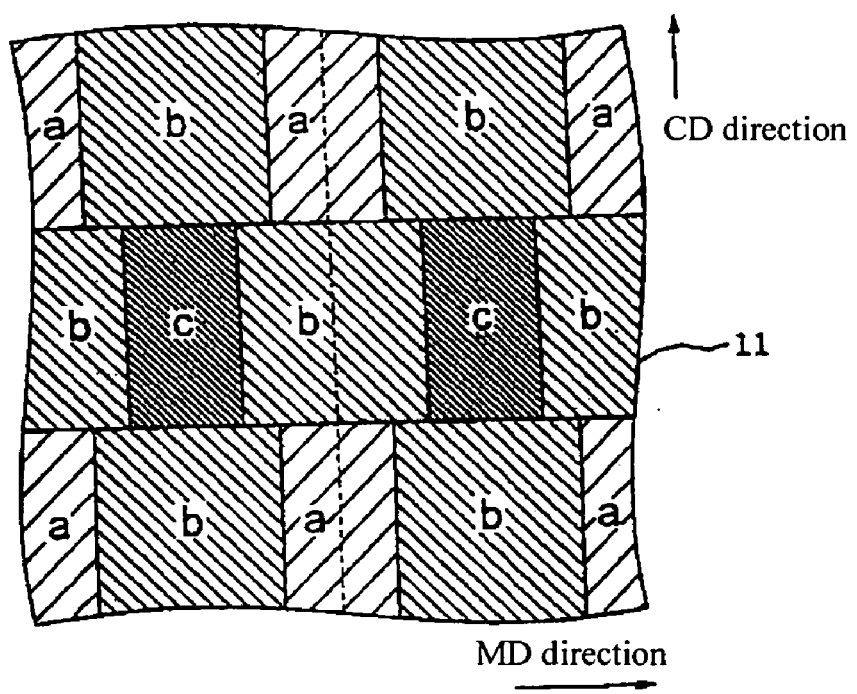
Figure 2:
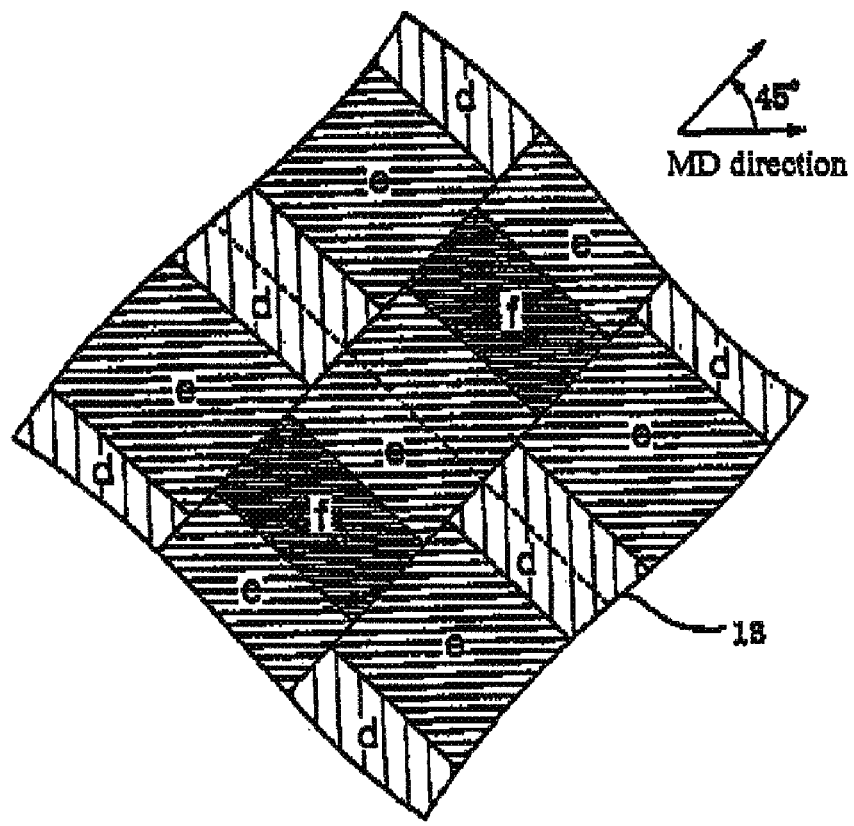
Figure 3:
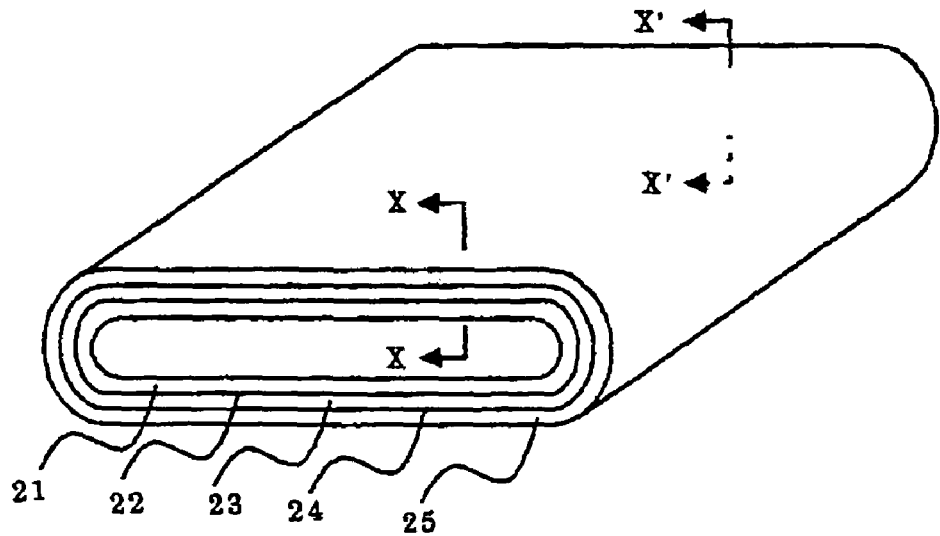
Figure 3:
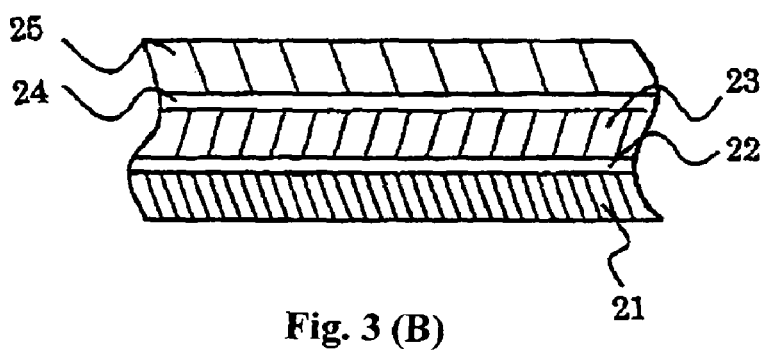
Figure 5:
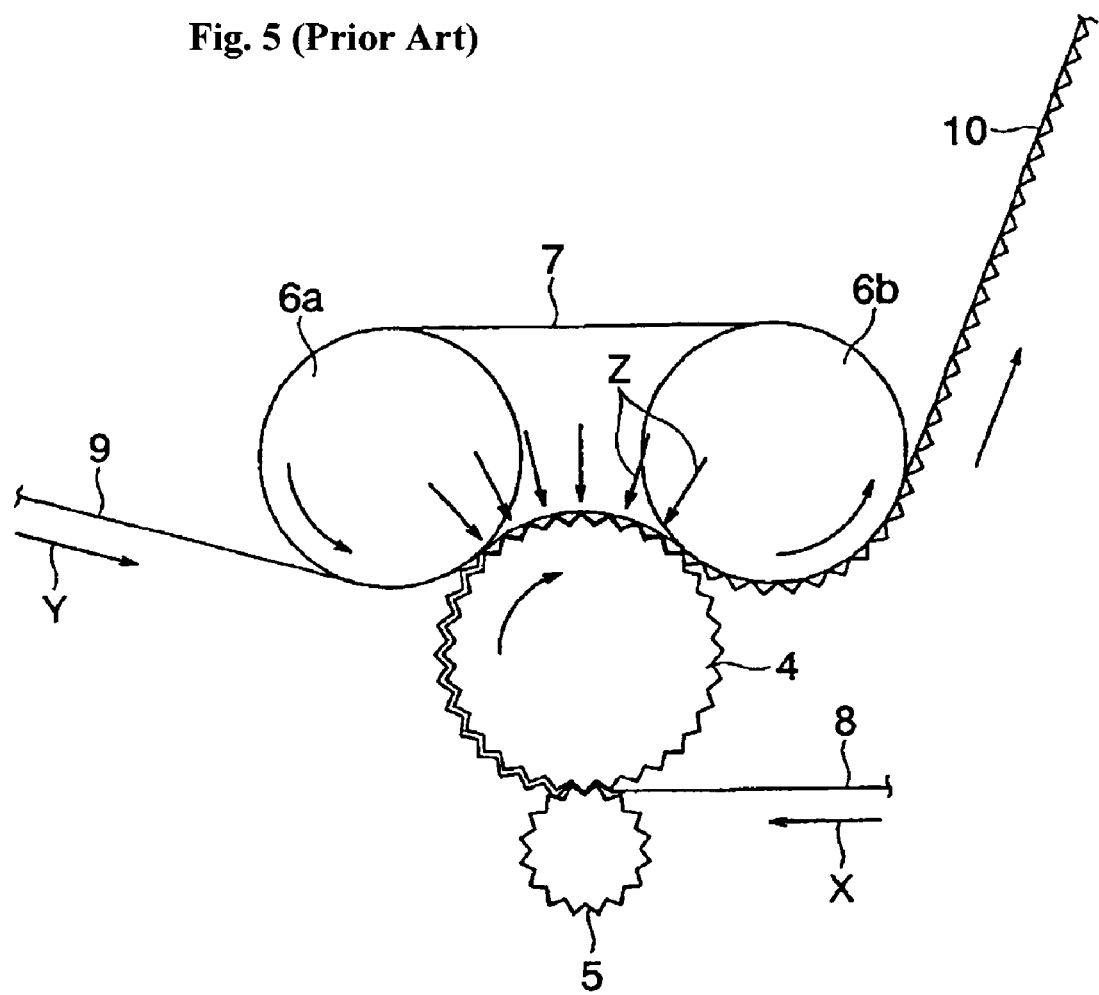
FIG. 5 is a schematic explanatory view of a single faced corrugated board manufacturing apparatus of a bonding type using a pressing belt.

While a heat resistant laminated conveyor belt of the present Embodiment 4 is similar to that of the Embodiment 3 shown in FIGS. 3(A) and (B), a plain weave wire as a surface layer 25 of the embodiment 4 is the same as that of the surface layer 13 of the Embodiment 2 shown in FIG. 2(C). That is, the surface layer 25 is formed such that the warp and weft directions of the plain weave wire are arranged bias by an angle of 45° relative to the winding length direction of the belt. Except that the surface layer 25 is so made, construction of the heat resistant laminated conveyor belt of the Embodiment 4 is the same as that of the Embodiment 3 and the manufacturing method of the conveyor belt is also the same. Hence, repeated description will be omitted.

Here, while an example of the surface layer 25 made by the plain weave wire has been described, the wire is not limited thereto but a knitted wire, for example, can be used.

COMPARISON EXAMPLE

FIGS. 4(A) and (B) show a comparison example of a prior art heat resistant laminated conveyor belt in which a belt core layer 31 is laminated with a reinforcing layer 33 via a PFA film as an adhesive layer 32.

The belt core layer 31 is made by a sack-form weave fabric or seamless weave fabric of aramide fiber and is obtained by repeating several times such a step that this woven fabric is impregnated with a PTFE resin dispersion and is then dried and sintered. Also, the reinforcing layer 33 is made by a knitted fabric of aramide fiber and is obtained by repeating several times such a step that this knitted fabric is impregnated with a PTFE resin dispersion and is then dried and sintered.

The heat resistant laminated conveyor belt of the present Comparison Example is manufactured as follows:

1) First, the belt core layer 31 is manufactured by the above-mentioned method using the seamless weave fabric of aramide fiber and the PTFE resin dispersion. Also, the reinforcing layer 33 is likewise manufactured using the knitted fabric of aramide fiber and the PTFE resin dispersion.

2) Next, the knitted fabric of aramide fiber impregnated with the PTFE resin for forming the reinforcing layer 33, as manufactured by 1) above, and the PFA resin film for forming the adhesive layer 32 are cut to the size of width and winding length of the belt core layer 31, as likewise manufactured by 1) above, in which the seamless weave fabric of aramide fiber is impregnated with the PTFE resin. Then, the belt core layer 31 so manufactured, adhesive layer 32 and reinforcing layer 33 are lapped one over another in this order.

3) Next, the layers in which the belt core layer 31, adhesive layer 32 and reinforcing layer 33 are so lapped are placed between hot press platens to be applied with a heat sealing lamination process under the condition of pressure of about 1.0 to 5.0 MPa, temperature of about 340 to 420° C. and holding time of 1 to 10 minutes. Then, this operation is repeated on each feed of the layers by a pitch of platen length of the hot press, so that the entire belt core layer 31 of the seamless weave fabric is laminated with the reinforcing layer 33 by the heat sealing. Finally, both ends of the reinforcing layer 33 are butt-jointed so that an endless heat resistant laminated conveyor belt is manufactured.

Table 1 shows measurement results of the belt surface pressure and single faced corrugated board production velocity using the heat resistant laminated conveyor belts of the above-mentioned Embodiments 1 and 2 and Comparison Example.

TABLE 1

| Nos. | Belt test sample | Belt surface pressure (kgf/mm²) *1 | Single faced corrugated board production velocity (mpm) *2 |
|---|---|---|---|
| 1 | Heat resistant laminated conveyor belt of the Embodiment 1 | 2.3 (About twice the conventional case) | 470 (About 1.2 times the conventional case) |
| 2 | Heat resistant laminated conveyor belt of the Embodiment 2 | 2.3 (About twice the conventional case) | 470 (About 1.2 times the conventional case) |
| 3 | Heat resistant laminated conveyor belt of the Comparison Example | 1.1 | 400 |

Note
*1 Surface pressure measured value at a contact area of the belt with a corrugation top portion of A-type fluted corrugating roll in a test apparatus simulating a belt pressing type single facer.
*2 Single faced corrugated board production velocity in the test apparatus simulating the belt pressing type single facer.

From the present results, it is found that the heat resistant laminated conveyor belts of the Embodiments 1 and 2 have a performance of the belt surface pressure of about two times and single faced corrugated board production velocity of about 1.2 times, as compared with the heat resistant laminated conveyor belt of the Comparison Example.

That is, as the heat resistant laminated conveyor belt according to the present invention has a surface having a hardness corresponding to a metal, such as steel or the like, and being formed by element wires having an uneven surface shape, the belt surface pressure when the liner and corrugated core paper are pressed and bonded together becomes high, so that the bonding performance is enhanced and the single faced corrugated board production velocity can be increased.

In the foregoing, while the present invention has been concretely described based on the embodiments, the present invention is by no means limited thereto but may be added with various modifications within the scope of the claims for patent as appended herein.

For example, the surface layer in the above-mentioned embodiments may be provided with plural layers or the belt layer constituting the belt core layer or intermediate layer on the inner side of the surface layer may be provided with plural layers.

What is claimed is:
1. A heat resistant laminated conveyor belt comprising:
a belt core layer comprising a heat resistant non-metallic fiber substrate which has been impregnated with a fluororesin dispersion, then dried and sintered,
an intermediate layer laminated on said belt core layer via an adhesive layer comprising a fluororesin film,
said intermediate layer comprising a heat resistant non-metallic fiber substrate which has been impregnated with a fluororesin dispersion, then dried and sintered, and
a surface layer laminated on said intermediate layer via an adhesive layer comprising a fluororesin film,
said surface layer having a fabric structure including an element wire or wires comprising a ferrous metal or
said surface layer having a structure in which said element wire or wires are arranged together; and
the surface of the surface layer having a hardness corresponding to steel and having an uneven surface shape, wherein
the fabric structure of said surface layer is formed by lapping said wire or wires one on another such that a warp direction of the fabric structure is arranged in a same direction as a running direction of said belt core layer.

2. The heat resistant laminated conveyor belt as claimed in claim 1, wherein said ferrous metal is a steel selected from iron steel, carbon steel or stainless steel.

3. The heat resistant laminated conveyor belt as claimed in claim 1, wherein said heat resistant non-metallic fiber substrate is selected from at least one of a glass fiber, carbon fiber, aramide fiber, aromatic allylate fiber or polyparaphenylenebenzobisoxazole (PBO) fiber.

4. The heat resistant laminated conveyor belt as claimed in claim 1, wherein said adhesive layer is a resin film layer selected from a polytetrafluoroethylene (PTFE) resin, denatured polytetrafluoroethylene (denatured PTFE) resin, tetrafluoroethylene hexafluoropropylene copolymer (FEP) resin, tetrafluoroethylene perfluoroalkoxyethylene copolymer (PFA) resin, ethylene tetrafluoroethylene copolymer (ETFE) resin or ethylene chlorotrifluoroethylene copolymer (ECTFE) resin.

5. The heat resistant laminated conveyor belt as claimed in claim 1, wherein one or both of said intermediate layer and belt core layer on the inner side of said surface layer are a plurality of layers.

6. A heat resistant laminated conveyor belt manufacturing method comprising:
a first step of forming a belt core layer by impregnating a heat resistant non-metallic fiber with a fluororesin dispersion, then drying and sintering,
a second step of forming an intermediate layer by impregnating a heat resistant non-metallic fiber substrate with a fluororesin dispersion, then drying, sintering and then lapping said intermediate layer over said belt core layer via an adhesive layer comprising a fluororesin film and
a third step of lapping a surface layer over said intermediate layer via an adhesive layer comprising a fluororesin film,
said surface layer having a fabric structure including an element wire or wires comprising a ferrous metal or
said surface layer having a structure in which said element wire or wires are arranged together, and
bonding said surface layer together with said belt core layer and intermediate layer by a heat sealing lamination process, and
the surface of the surface layer having a hardness corresponding to steel and having an uneven surface shape, and
forming the fabric structure of said surface layer by lapping said wire or wires one on another such that a warp direction of the fabric structure is arranged in a same direction as a running direction of said belt core layer.

7. The heat resistant laminated conveyor belt manufacturing method as claimed in claim 6, wherein one or both of said intermediate layer and belt core layer on the inner side of said surface layer are a plurality of layers lapped one on another via an adhesive layer or layers and then subjecting said layers to the heat sealing lamination process.

* * * * *